United States Patent [19]

McMurtry

[11] Patent Number: 4,819,491
[45] Date of Patent: Apr. 11, 1989

[54] POSITION-DETERMINING APPARATUS

[75] Inventor: David R. McMurtry, Wotton-Under-Edge, United Kingdom

[73] Assignee: Renishaw plc, United Kingdom

[21] Appl. No.: 206,342

[22] PCT Filed: Oct. 20, 1987

[86] PCT No.: PCT/GB87/00747
§ 371 Date: Jun. 17, 1988
§ 102(e) Date: Jun. 17, 1988

[87] PCT Pub. No.: WO88/02843
PCT Pub. Date: Apr. 21, 1988

[30] Foreign Application Priority Data

Oct. 20, 1986 [GB] United Kingdom ................ 8625052

[51] Int. Cl.$^4$ ........................................... G01M 19/00
[52] U.S. Cl. .................................. 73/865.8; 73/866.5
[58] Field of Search ............... 33/1 M; 356/401, 72, 356/376; 73/865.8, 866.1, 866.5; 409/126

[56] References Cited

U.S. PATENT DOCUMENTS

| | | | |
|---|---|---|---|
| 3,514,869 | 6/1970 | Kelling | 33/174 |
| 3,741,659 | 6/1973 | Jones, Jr. | 356/109 |
| 4,078,314 | 3/1978 | McMurtry | 33/174 L |
| 4,355,904 | 10/1982 | Balasubramanian | 356/376 |
| 4,575,942 | 3/1986 | Moriyama | 33/1 M |

FOREIGN PATENT DOCUMENTS 2654839 8/1977 Fed. Rep. of Germany .
2298084 8/1976 France .

Primary Examiner—Jerry W. Myracle
Attorney, Agent, or Firm—Parkhurst, Oliff & Berridge

[57] ABSTRACT

The apparatus disclosed is a co-ordinate measuring machine having a column (33) movable relative to an object (11) for determining the contour (12) thereof. A tube (15) movable relative to the column (33) has a lens (18) focussing light to a sensing point (19) intended to lie at the contour (12). When, on moving the column (33) across the contour (12), the contour (12) rises relative to the column (33) and the lens (18), the change is at first detected by an optical position sensor (23) which produces an error signal (26A) to a motor (27) causing the latter to move the tube (15) in the sense restoring the sensing point (19) to the new position of the contour (12). The movement of the tube (15) is sensed by a further position sensor (30) which outputs a signal (30Z) connected to move the column (33) in the sense of restoring its previous position relative to the tube (15). The latter signal (30Z) is shaped to produce an initially slow response in the column (33) so that the relatively greater inertia thereof is accommodated.

10 Claims, 6 Drawing Sheets

POSITION-DETERMINING APPARATUS

This invention relates to position-determining apparatus. Such apparatus may be arranged for performing a contour-following operation wherein the position of a machine member is determined in accordance with variations in the surface contour of an object. There exists a difficulty in that the inertia of a relatively heavy said machine member is inconsistent with rapid contour-following operations especially where sudden contour changes or contours of high gradients are involved. It is an object of the invention to reduce or overcome this difficulty.

A similar difficulty exists in position-determining apparatus arranged for performing a positioning operation wherein a machine member has to be moved and then halted in an accurately specified position. The inertia of the member may be inconsistent with rapid and accurate such positioning, and it is an object of the invention to reduce or overcome the inertia problem in the context of a positioning operation.

The invention is of use for contour-following or for positioning operations to be carried out in co-ordinate measuring machines where a probe having a sensing point is provided on a said machine member and where the inertia of the machine member is a difficulty in accurate sensing of the contour or in accurate positioning of the sensing point.

Examples of apparatus according to this invention will now be described with reference to the accompanying drawings wherein.

PRIMARY POSITIONING SYSTEM

Figure 1:
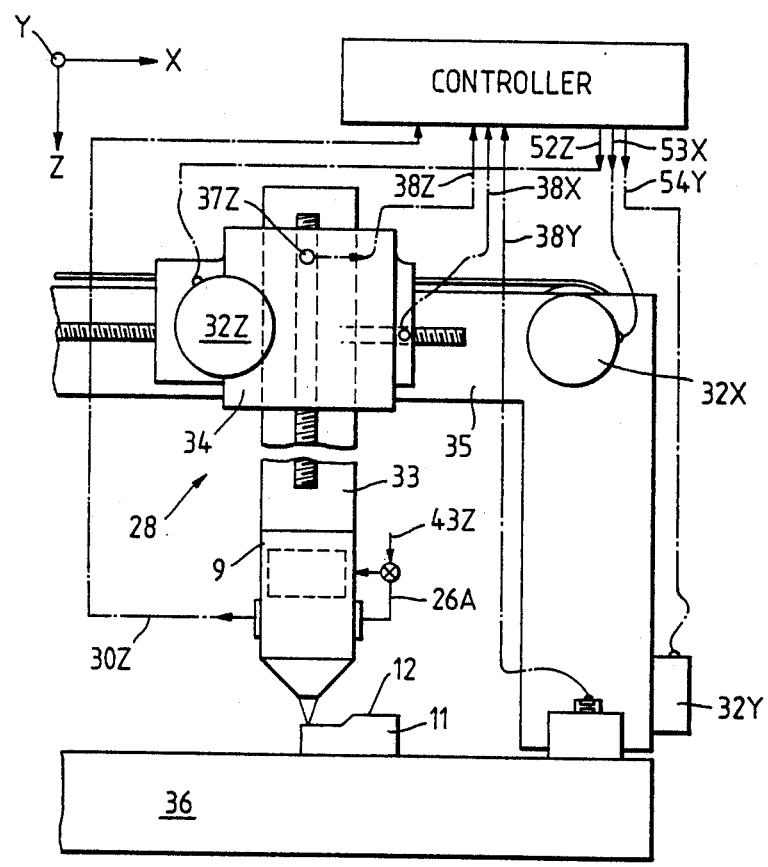
FIG. 1 is an elevation of a co-ordinate measuring machine being a primary positioning system.
Figure 2:
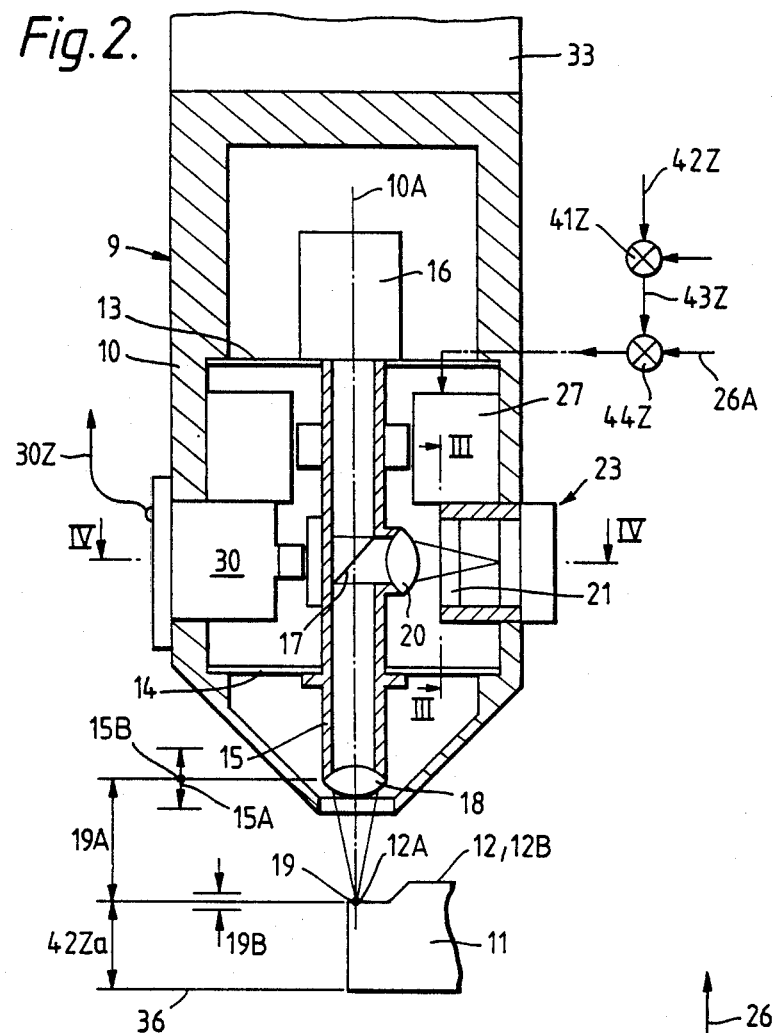
FIG. 2 is an enlarged sectional detail of a probe shown in FIG. 1.

Referring to FIGS. 1 to 6, the co-ordinate measuring machine (FIG. 1) comprises a table 36 supporting a column 33 for displacement relative thereto in the three directions X, Y and Z of the orthogonal co-ordinate system. The column 33 is supported on a carriage 34 for movement in the Z direction, the carriage 34 is supported on a track 35 for movement in the X-direction, and the track 35 is supported on the table 36 for movement in the Y-direction so that any combined movement in the three directions is possible. A motor 32Z is provided for moving the column 33 in the Z-direction. Corresponding motors 32X and 32Y are provided for moving the carriage 34 and the track 35 in the X and Y directions respectively. The position of the column 33 relative to the carriage 34 is measured by a position sensor 37Z being a scale and scale reader known per se and having an output 38Z. Corresponding sensors 37X, 37Y, having outputs 38X, 38Y, are provided for the X and Y-directions. The machine as described so far is also referred to herein as a primary positioning system 28.

SECONDARY POSITIONING SYSTEM AND SCANNING OPERATION

The column 33 has a free end to which is secured a probe 9 comprising a base or housing 10 (FIG. 2) having an axis 10A extending in the Z direction. Within the housing, there is provided a sensing member or tube 15 aligned with the axis 10A and connected to the housing by a pair of planar springs 13, 14 which allow limited axial displacement of the tube but constrain the tube against any other displacement. A laser light source 16 secured within the upper end of the tube projects a collimated beam of light through a beam splitter 17 onto a lens 18 secured within the lower end of the tube and adapted to focus the light to a spot 19 defining the sensing point of the probe 9.

The probe 9 is shown in relation to an object 11 mounted on the table 36 and having a surface or contour 12 to be measured by a scanning, i.e., a contour-following operation comprising passing the probe across the surface in the X-direction to perform the so-called feed movement and at appropriate intervals sampling the local height of the contour in the Z or measuring direction. For the purpose of such scanning the column 33 is positioned so that the axis 10A intersects the contour 12 at an appropriate starting point e.g. at a point 12A of the contour 12, and as a starting condition the spot 19 is regarded as lying on the surface of the object at the point 12A. The exact positioning of the spot 19 at the point 12A is described later herein.

Light reflected from the point 12A is re-collimated by the lens 18 and is directed by the beam splitter 17 transversely to the axis 10A and through a focussing lens 20 (FIGS. 2 to 4) onto a position sensor 23 where the now convergent beam is divided by a prism 21 into two beams 22A, 22B. When, as at present, the surface 12 is at the focal point of the lens 18, the beam 22A is focussed at the junction of two transducers 22A1, 22A2 while the beam 22B is focussed at the junction of two transducers 22B1, 22B2.

Figure 3:
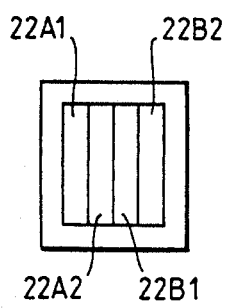
FIG. 3 is an enlarged section on the line III—III in FIG. 2.
Figure 4:
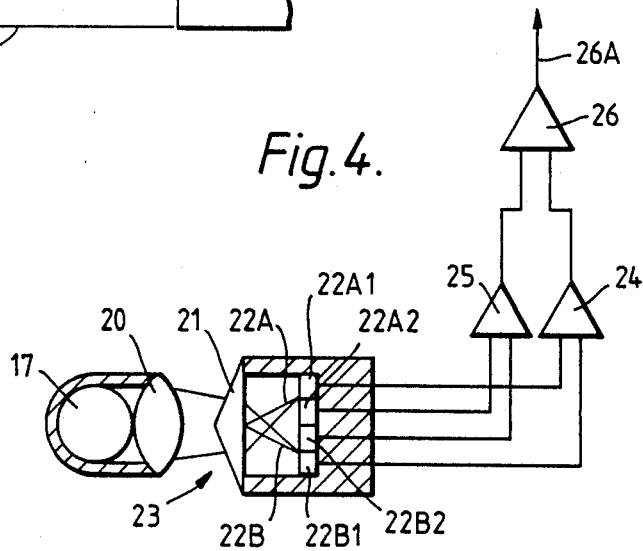
FIG. 4 is an enlarged section on the line IV—IV in FIG. 2.
Figure 5:
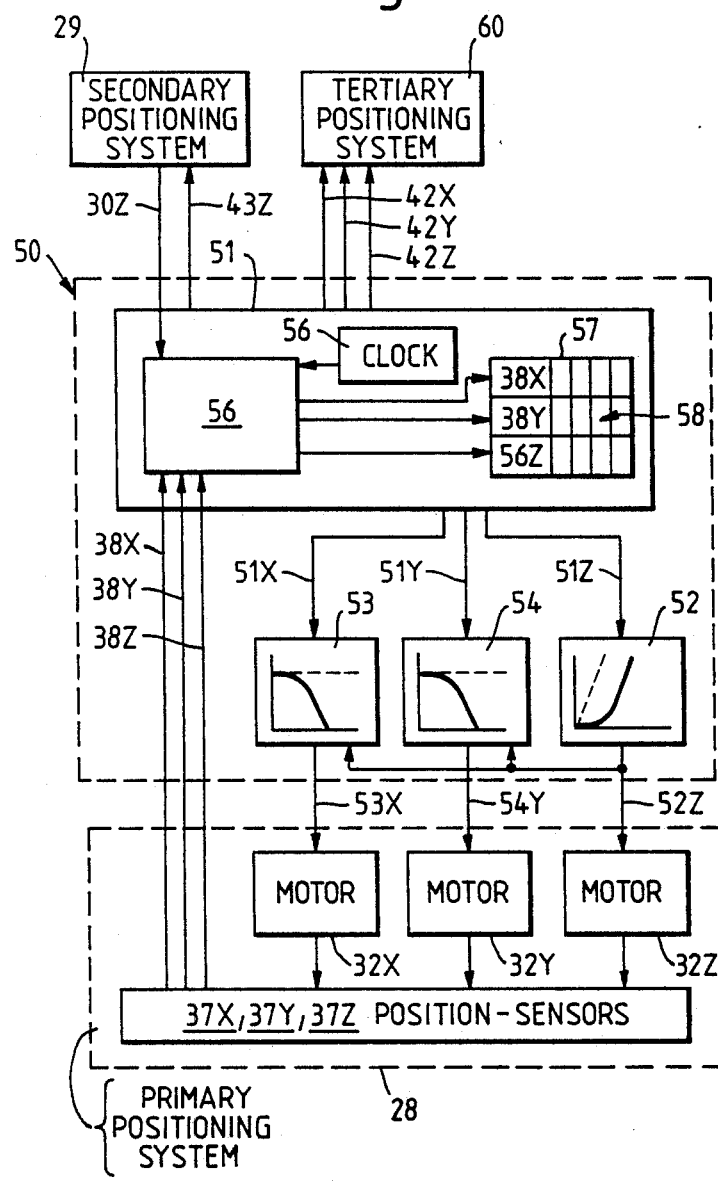
FIG. 5 is a diagram of a computer system for controlling the operation of the machine shown in FIG. 1 and probe shown in FIG. 2.
Figure 6:
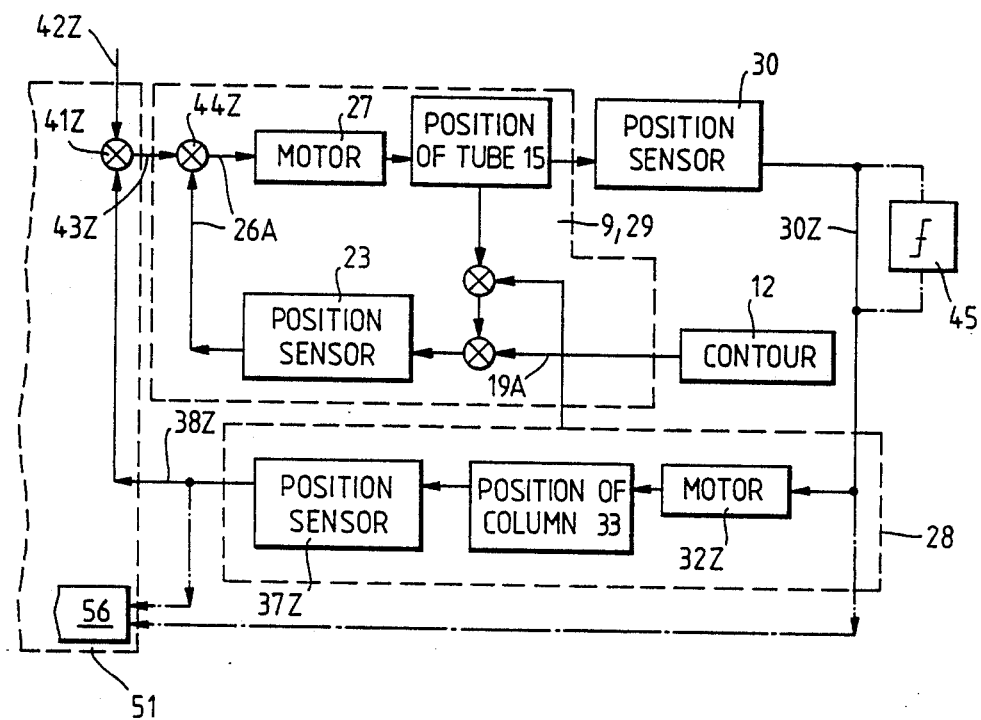
FIG. 6 is a control circuit diagram of a primary and a secondary positioning system used in the context of FIGS. 1 and 2.

When, for the purpose of the scanning operation, the carriage 34 is moved along the track 35 the axis 10A comes to intersect, for example, a relatively higher point 12B where the lens 18 would be out of focus. The now relatively closer proximity of the point 12B to the lens 18 causes the beams 22A, 22B to move apart so that illumination of the outer transducers 22A1, 22B1 increases while that of the inner transducers 22A2, 22B2 decreases. Had the point 12B been relatively lower, the beams 22A, 22B would have moved toward each other and the inner transducers 22A2, 22B2 would have had the predominant illumination. The outer transducers 22A1, 22B1 are connected to a summing amplifier 24 while the inner transducers 22A2, 22B2 are connected to a summing amplifier 25. The outputs of the amplifiers 24, 25 are connected to a differential amplifier 26 so arranged that its output 26A goes positive or negative according to whether the distance, 19A, between the surface 12 and the lens 18 increases or decreases. To accommodate the relative movement between the tube 15 and the sensor 23 the prism 21 and the transducers 21A1, 22B1, 22A2, 22B2 are elongate in the direction of the movement of the tube 15 (FIG. 3).

The output of the amplifier 26 is connected to a linear motor 27 (FIGS. 2, 6) surrounding the tube 15 and so arranged that when the distance 19A tends to decrease, i.e. when the surface 12 rises toward the lens 18, the tube 15 is raised to bring the surface 12 back into focus. Correspondingly the tube is lowered when the distance 19A tends to increase. Thus the connection between the transducer system 23 and the motor 27 is a closed loop, operating to keep the distance 19A constant at the value of the focal distance of the lens 18, and this loop is also referred to as a secondary positioning system 29. It will be clear that the position demand signal for the system 29 is the position of the contour 12 as indicatd in FIG. 6.

A position sensor 30 (FIG. 2) having a substantially linear output signal 30Z is provided in the housing 10 and arranged to measure the displacement of the tube 15 relative to the housing. In this way, variations in the height of the surface 12 can be measured continually by the probe 9 as the carriage 34 is moved along the track 35 so long as these variations lie within a range 15A over which the tube 15 can be displaced. The signal 30Z is arranged to be zero when the tube 15 is at the midpoint 15B of the range 15A as shown. The sensor 23 responds to excursions 19B of the contour 12 which are very small, e.g. ±0.001 mm, compared to the range 15A which may be ±5 mm.

The signal 30Z is connected to a controller 50 (FIG. 5, 6) having a computer 51 and adapted to operate as follows. Responsive to the signal 30Z varying from zero, the computer 51 outputs a corresponding substantially linear signal 51Z to a function generator 52. The function generator 52 is adapted to produce a signal 52Z which is a quadratic or similar function of the signal 51Z so that the signal 52Z rises initially at a very slow rate and, with increasing magnitude of the signal 51Z, rises at a progressively increasing rate. The signal 52Z is connected to drive the motor 32Z of the primary positioning system 28. The arrangement is such that, as the tube 15 rises or lowers relative to the mid-position 15B of the range 15A, the motor 32Z is driven so that the column 33 is raised or lowered accordingly and, by virtue of the function generator 52, the column 33 has a slow response at small excursions of the tube 15 but responds more rapidly as the tube 15 approaches the limits of the range 15A. This enables the probe 9 to respond to small changes in the profile 12 without significant excursions of the relatively heavy column 33. However, relatively larger changes in the profile 12 cause the column 33 to respond more rapidly so that the tube 15 tends not to reach the limit of the range 15A.

The computer 51 is also adapted to produce a predetermined signal 51X defining the speed of the motor 32X, i.e. the speed of the carriage 34 in the X direction. The signal 51X is connected to a function generator 53 adapted to produce a signal 53X connected to drive the motor 32X. The function generator 53 is adapted to shape the signal 53X in inverse relationship to the signal 52Z so that the carriage 34 is slowed down if the column 33 is speeded up due to an increasing gradient of the contour 12. The condition under which the tube 15 approaches the limit of its range 15A would result in the carriage 34 being halted. In this way the speeds of the primary system 28 are related to the contour 12 in the sense that as the gradient of the contour 12 increases, the speed in the measuring direction Z is increased while the speed in the feed direction X is decreased, and vice versa.

Figure 7:
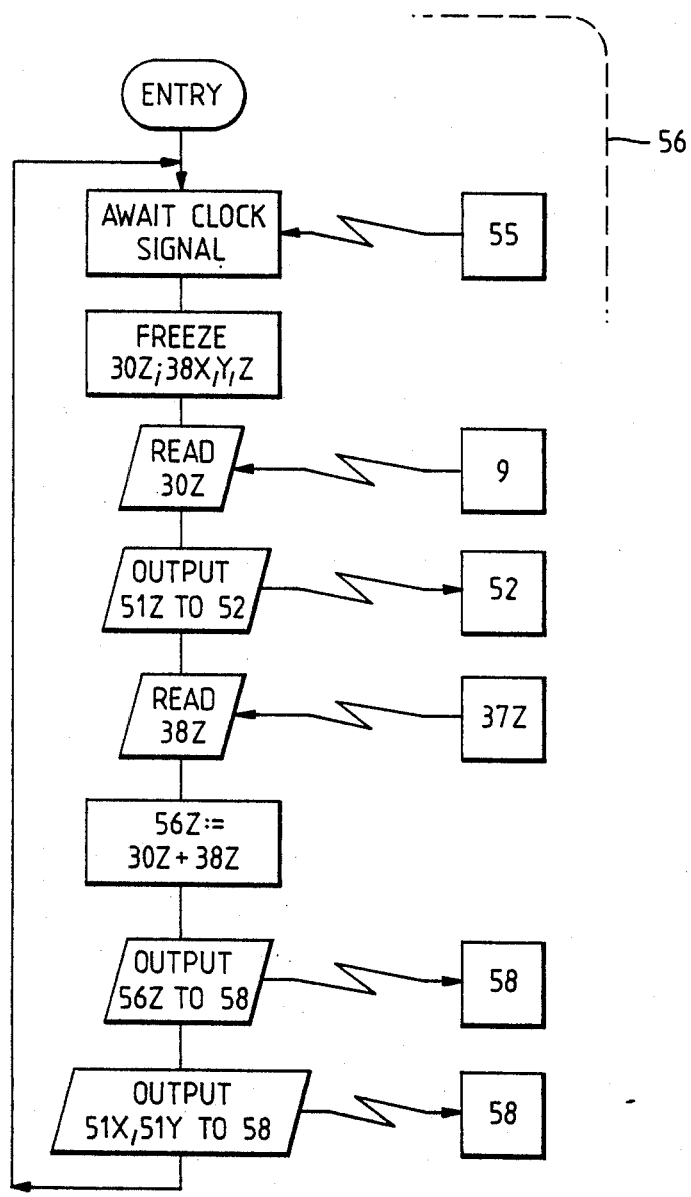
FIG. 7 is a flow diagram of a program used in the above computer system.

Further, inasmuch as the primary positioning system 28 responds to a change in the gradient of the contour 12 more slowly than the secondary system 29, the true instantaneous height of the contour 12 is the sum of the signals 30Z and 38Z at any given instant. Accordingly the computer 51 is programmed to sample the signal 38X, or the signal 38Y if applicable, at selected intervals of time produced by a clock 55, and by an operation 56 determine a signal 56Z being the sum of the signals 38Z, 30Z. Details of the sampling program are shown in FIG. 7.

Lastly, the computer 51 is adapted to feed the signals 56Z into a store 57 where the values of the signals 56Z, 38X, 38Y of any one sampling instant are stored in the form of a table 58 defining the contour 12.

The arrangement of the primary and secondary positioning systems 28, 29 effectively extends the relatively small operating range 15A of the probe 9 to that of the operating range of the column 33, which may be of the order of 1000 mm, while substantially avoiding the inertia effects of the relatively large masses of the members 33, 34.

In a modification of the probe (not illustrated) the light source 16, beam splitter 17 and lens 20 are fixed relative to the housing 10. As a result the prism 21 and transducers 22A1, 22B1, 22A2, 22B2 need not be elongate as is required by the probe 9 (FIG. 3), and the motor 27 and transducer 30 are both arranged on a relatively shorter tube 15. Otherwise the probe is analogous to the probe 9.

POSITION DEMAND OPERATION

Referring further to FIGS. 2 to 6, instead of being used for scanning a contour, the apparatus may be adapted for driving the sensing point or spot 19 to a selected position, e.g. the starting point 12A on the contour 12. To this end there is introduced a position demand operation in which the secondary positioning system 29 is connected to a predetermined position demand signal 42Z held in the computer 51 and defining, in this example, a distance 42Za (FIG. 2) between the point 12A and a datum being the surface of the table 36. The signal 42Z and the output 38Z are fed to a summing junction 41Z (FIGS. 2, 6) whose error output, 43Z, is connected to the system 29 through a junction 44Z. To enable the signal 38Z to access the junction 41Z, an otherwise open switch 45 (not shown) is closed. The arrangement is such that the signal 43Z is placed as a position demand on the motor 27 and this results in a corresponding displacement of the tube 15 and output 30Z. Inasmuch as the error signal 43Z exceeds the relatively sensitive response of the system 29, the demand is communicated by the signal 30Z to the motor 32Z to position the column 33 accordingly. The error 43Z becomes zero when the output 38Z equals the demand 42Z, the signal 30Z tending to zero at the same time. The signal 30Z may be passed through a threshold amplifier or dead band device 45 (FIG. 6) so that the motor 32Z is energised only if the signal 30Z exceeds a given magnitude. In such a case only the lower orders of magnitude of the demand 42Z are represented by displacement of the tube 15 while the higher orders of magnitude are represented by displacement of the column 33. In this way positioning to a very fine resolution may be achieved.

When the sensing point 19 reaches the desired position at the contour 12, as indicated by the error signal 41Z attaining zero, the point 19 can be exptected to lie well within the sensing range of the probe 9. The computer 51 is programmed, at this stage, to switch off the signal 42Z and open the switch 45, whereafter the secondary system 29 becomes operational.

TERTIARY POSITIONING SYSTEM

Figure 8:
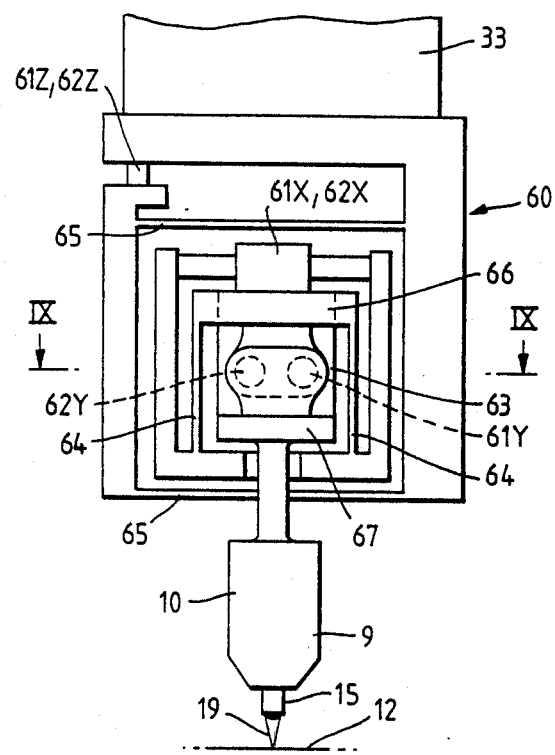
FIG. 8 is an elevation of a tertiary positioning system.
Figure 9:
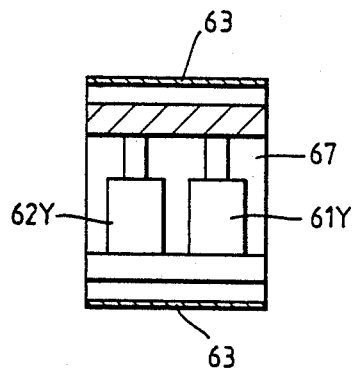
FIG. 9 is an enlarged section on the line IX—IX in FIG. 8.

Inasmuch as the location of the point 12A is given in three dimensions, it is necessary to effect positioning three-dimensionally. To this end, and to improve accuracy of positioning in the X or Y directions, there may be provided a tertiary positioning system 60 (FIG. 8) which is arranged between the column 33 and a member 67 supporting the housing 10 of the probe 9. The system 60 may comprise three pairs 63, 64, 65 of planar springs connected in series substantially as shown in our British Patent No. 1,551,217. The pair of springs 63 is connected between the member 67 and a member 66, and a positioning motor 61Y and a position transducer 62Y are arranged between the members 66, 67. A corresponding arrangement supports motors 61X, 61Z and transducers.

Figure 10:
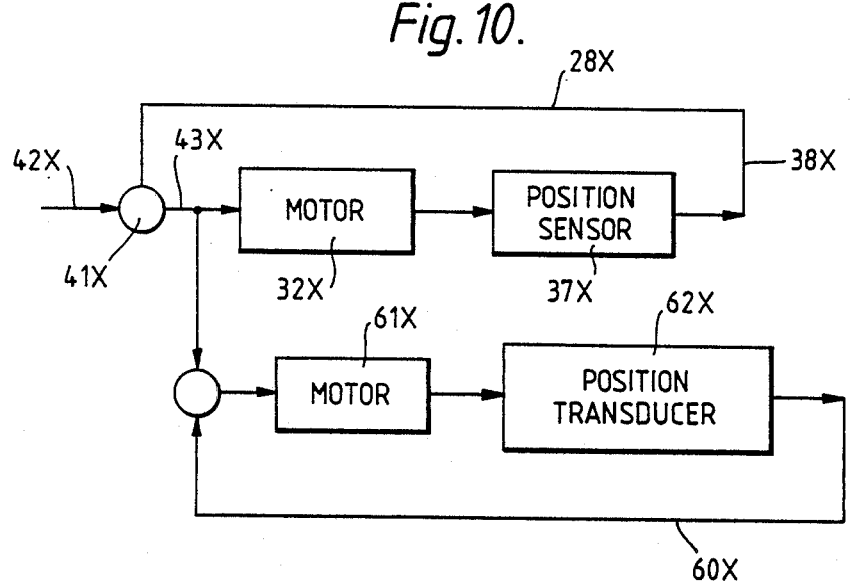
FIG. 10 is a control circuit diagram of the tertiary positioning system.

The control system diagram of FIG. 10 shows the use of the tertiary system in conjunction with the primary system. There is shown a primary closed loop 28X in which a position demand signal 42X, generated by the computer 51 (FIG. 5) is fed to a summing junction 41X to produce an error signal 43X to the motor 32X (FIGS. 1, 5), the feedback signal 38X being fed to the junction 41X. The error signal 43Z is connected as a demand signal to a tertiary closed loop (60X) of the system 60 thereby to produce a precise positioning of the probe 9 in the X direction. The loop 60X comprises the motor 61X and transducer 62X as shown. The Y and Z-direction movements of the tertiary system 60 are produced in a corresponding way in response to a demand signal 42Y and said demand signal 42Z. However, the Z-direction movement may be produced through the intermediary of the motor 27 as described with reference to FIGS. 1 and 6 if the probe 9 is used.

The tertiary system may be used in conjunction with the primary system, i.e., solely on the basis of signals 42X, 42Y, 42Z or in conjunction with both the primary and secondary systems. Further, instead of using the probe 9 in conjunction with the system 60, use may be made of a probe (not shown) capable of producing a signal when the sensing means of the probe responds to the presence of the surface 12. Such probes are known per se and may be of the kind wherein the signal is a pulse signal when the surface 12 is encountered or wherein the signal is an analogoue signal which varies with the extent of proximity between a probe housing, such as the housing 10, and the surface 12. Such a probe may be an optical probe or a mechanical probe having a stylus adapted to make physical contact with the surface.

I claim:

1. Apparatus for determining the position of a surface of an object, comprising a support, a first member supported on the support for movement relative thereto, a primary positioning system for positioning the first member relative to the support in response to a first error signal and so as to keep the first member at a constant distance from said surface, a second member supported on the first member for movement relative thereto, the second including a sensing point and intended to have a first predetermined relationship to the first member and a second predetermined relationship to said surface, first sensing means for sensing said first relationship and adapted to generate said first error signal, second sensing means for sensing said second relationship, a secondary positioning system responsive to said second sensing means for tending to maintain said second relationship constant thereby tending to disturb said first relationship if there is a change in the position of the surface relative to the first member, and the first error signal cooperating to restore said first relationship.

2. Apparatus according to claim 1, wherein the secondary positioning system comprises a motor means for moving the second member relative to the first member and connected to be driven by a second error signal in the sense of reducing the second error signal to zero, the second sensing means is adapted for sensing displacement between the second member and said surface and for producing the second error signal accordingly.

3. Apparatus according to claim 2 comprising means for producing a position demand signal connectable to the secondary positioning system to act on the primary positioning system through the intermediary of the secondary positioning system.

4. Apparatus according to claim 3 wherein the primary positioning system comprises a motor means for moving the first member relative to the support, sensing means for sensing displacement between the support and the first member and for producing a corresponding position feedback signal, means for forming an error signal being the difference between the position demand and feedback signals, and wherein the error singal is connected as an input to the motor means of the secondary positioning system.

5. Apparatus according to claim 2 wherein the second sensing means comprises optical means provided on the second member for focussing incident light to a spot intended to lie at said surface and said second error signal defines a distance by which the spot is displaced from the surface.

6. Apparatus according to claim 1 comprising shaping means for shaping the first error signal in the sense of generating values which rise from an initially low rate to a progressively increasing rate as the first error signal rises from zero as a result of said disturbance of said second relationship.

7. Apparatus according to claim 6 comprising means for adding the instantaneous shaped values of the displacement between the first and second members to the values of the displacement between the second and third members.

8. Apparatus according to claim 6 comprising means for producing a position demand signal for the primary position system for driving the second member in a direction transverse to a direction in which the second member is movable relative to the first member, and shaping means for shaping the position demand signal in the sense of generating values which are inversely related to the values generated by the first-mentioned shaping means.

9. Apparatus according to claim 1 comprising a tertiary positioning system which is arranged between the first member and a support relative to which the second member is movable in a given direction and which includes a closed loop for positioning the second member at least in one direction transverse to said given direction.

10. Apparatus according to claim 9, wherein the primary positioning system is driven by a closed loop having an error signal connected to drive a motor means of the said loop and also connected as a demand signal to a closed loop of the tertiary positioning system.

* * * * *